United States Patent [19]

Limb

[11] 4,129,882
[45] Dec. 12, 1978

[54] VIDEO CODER FOR COLOR SIGNALS
[75] Inventor: John O. Limb, Tinton Falls, N.J.
[73] Assignee: Bell Telephone Laboratories, Incorporated, Murray Hill, N.J.
[21] Appl. No.: 794,361
[22] Filed: May 6, 1977
[51] Int. Cl.² .............................................. H04N 9/02
[52] U.S. Cl. ...................................................... 358/13
[58] Field of Search ..................................... 358/12, 13
[56] References Cited
PUBLICATIONS Acta Electronica 19, 4, 1976 pp. 277–287.
Electronics and Communication In Japan 47#1 pp. 59–69.

Primary Examiner—Robert L. Richardson
Attorney, Agent, or Firm—John Francis Moran

[57] ABSTRACT

The luminance and two chrominance signals generated in a color video system are all translated into pulse code modulation signals by a plurality of analog-to-digital encoders. The luminance signal is then differentially encoded into variable length digital words and applied to a buffer. The encoded differences of the luminance signal are between the values of successive picture elements along horizontal scan lines. At least one of the chrominance signals is encoded using differences between corresponding picture element values in alternate horizontal scan lines. When the differences are large, the value of the corresponding picture element of the intermediate horizontal scan line is classified. If half the difference between the large transition of alternate picture element values does not correspond to the value of the intermediate picture element, another code word indicative of both intermediate picture element and alternate picture element is used. This improves the coding accuracy of large transitions in the chrominance signal which is also applied to the buffer. The output of the buffer is then transmitted over a channel to receiver. The receiver decodes each signal component to produce an analog replica. The chrominance signal is decoded using an interpolation technique that is also responsive to the code words indicative of both intermediate and alternate picture element values. Accordingly, the analog replica of the chrominance signal is produced which faithfully reproduces sharp color edges in the video scene.

6 Claims, 6 Drawing Figures

VIDEO CODER FOR COLOR SIGNALS

BACKGROUND OF THE INVENTION

This invention relates to video signal processing and, more particularly, to a digital signal processor for use with chrominance signals which are developed in a color video system.

In the conventional transmission of analog color television signals, chrominance signals are transmitted using a narrower bandwidth than the bandwidth for the luminance signal to capitalize on one characteristic of visual perception. Namely, the eye has less resolution to changes in a color television scene produced by the chrominance signal than those produced by the luminance signal. This technique is used in the various arrangements for generating different forms of total video signals each including a luminance signal and one or more chrominance signals such as, for example, those used in the NTSC, SECAM and PAL systems of video color transmission.

The principle of this technique and other techniques exploiting different characteristics of visual perception have also been utilized in the newer field of digital coding of color signals for transmission. For example, one technique is to code the luminance and individual chrominance signals each separately and, accordingly, to different degrees of accuracy or resolution. However, what has not been appreciated and/or exploited heretofore is that a negative orthogonal correlation exists between luminance and chrominance signals. Within the total video signal generated by conventional processing of a typical television scene, the occurrence of high density luminance variations along a horizontal scan line is often accompanied by a low density of chrominance variations in the vertical or orthogonal direction between corresponding picture elements from one scan line to vicinal scan lines. Fortunately, the converse situation also occurs.

An object of the present invention is to reduce the amount of information required to transmit a broadcast quality color signal using signal processing techniques that also serve to minimize fluctuations in information content of the total video signal.

A related object is to increase the information efficiency of a total video signal by exploiting the above-mentioned relationship between luminance and chrominance signals.

Another object is to code chrominance signals using interpolation techniques that provide increased resolution to large edge changes of chrominance components while reducing the quality of fine detail to which visual perception has low resolution.

SUMMARY OF THE INVENTION

Broadly, the invention takes the form of a differential encoder for use with a video information signal which includes a luminance signal component and at least one chrominance signal component wherein the differences between picture elements of the respective signal components are orthogonally related due in part to conventional video signal processing. While differences of one component are between successive samples along horizontal scan lines, the differences in the other signal component are between samples in corresponding positions of two different horizontal scan lines. The negative correlation between the orthogonal differences efficiently generates a more uniform information rate.

In another aspect of the invention, the chrominance signal component is normally encoded as differences between pairs of corresponding samples of alternate scan lines into a predetermined number of quantum levels and the corresponding sample of the intermediate scan line is determined by using half the difference between the samples. When the difference between the pairs corresponds to at least the quantum levels having the largest value magnitude, the difference between the corresponding sample and one of the pairs of samples may be utilized to provide more accurate coding. Specifically, when the encoded difference of the corresponding sample produces less error than half the difference, a signal representation is utilized to indicate both the intermediate sample and the large magnitude difference.

In some of the further aspects of the invention, a decoder with a weighter that operates at twice the rate and normally using half values provides the interpolation process which generates the value of intermediate samples of the chrominance signal. In the encoder, a gating arrangement responds to the largest magnitude values and utilizes the value of the intermediate sample when the latter provides a better representation of large edge changes in the chrominance signal than the interpolation process.

BRIEF DESCRIPTION OF THE DRAWING

A more complete understanding of the invention and the various features, additional objectives, and advantages thereof may be more readily appreciated and better understood by reference to the following detailed description in conjunction with the drawing.

DETAILED DESCRIPTION

Figure 1:
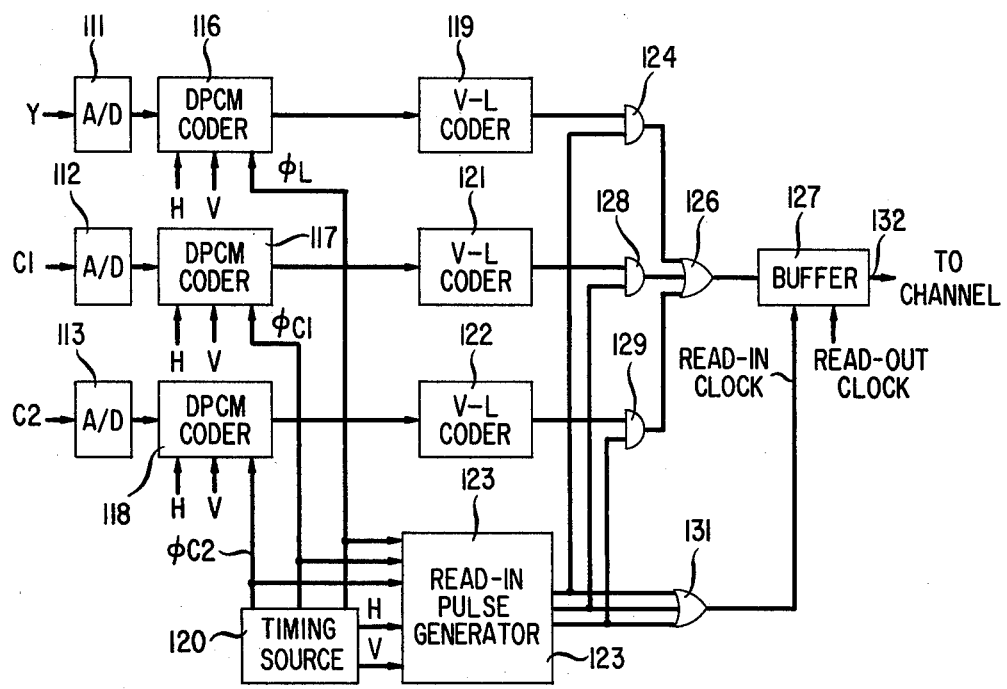
FIG. 1 is an overall diagram of a coding arrangement in accordance with the invention.

In FIG. 1, a luminance and two chrominance signals, all baseband generated by a typical video camera or from a video system, e.g., NTSC, each serve as an input to one of analog-to-digital converters 111, 112 and 113. Converter 111 transforms the baseband luminance signal into a pulse code modulation (PCM) type digital signal for coder 116. Correspondingly, the two chrominance signals are each converted into digital form by analog-to-digital converters 112 and 113 and applied respectively to coders 117 and 118. Coder 116 is of conventional design and encodes the difference between successive samples, thereby removing redundant information present in the original signal. Coders 117 and 118, which act on the chrominance signal information, include at least one uniquely designed coder which, in combination with coder 116, provide the advantages of the inventive principles hereinafter disclosed. The output of these coders is individually applied to coders 119, 121 and 122 which produce output words of variable length to eliminate the redundancy or inefficiency inherent to code words of fixed lengths. The operation of coders 116, 117 and 118 is synchronized in accordance with output pulses produced by synchronization pulse generator 120. The output pulses of generator 120 are also applied to read-in pulse generator 123.

Figure 2:
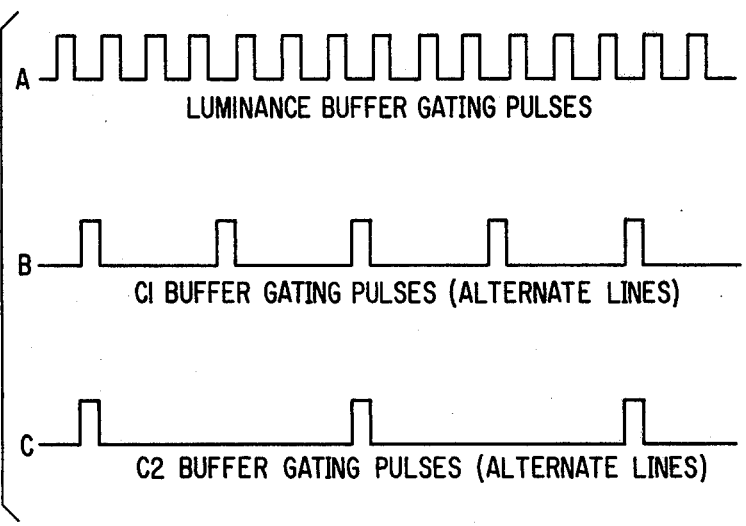
FIG. 2 is a waveform diagram useful in explaining the sequence of operations performed in the arrangement of FIG. 1.

FIG. 2 is a waveform diagram which illustrates the sequence of output pulses produced by generator 123. The pulses of waveform A are applied to AND gate 124 and serve to enable the gate for passage of code words from coder 119 to OR gate 126 for being read into buffer 127. Waveform B is similarly applied to AND gate 128 and serves to gate in the code words produced by coder 121 during the intervals between successive outputs of gate 124. Waveform C is a pulse train that is applied to AND gate 129 to read in the output of coder 122 via OR gate 126 to buffer 127. Concurrent with the information presented by OR gate 126 to buffer 127, the output of OR gate 131 produces read-in clock pulses for the buffer to signal it to accept this information. It should be pointed out that since the chrominance signal has a lower information content than the luminance signal, the pulses of waveforms B and C may be alternated, for example, by reading information into buffer 127 from gate 128 during the odd horizontal scan lines, while the information from AND gate 129 is read into buffer 127 during even horizontal scan lines. Buffer 127 provides an elastic temporary storage to enable the bursts of information presented to buffer 127 to be read out at output 132 for transmission at a constant rate compatible with the capacity of the transmission medium or channel.

Figure 3:
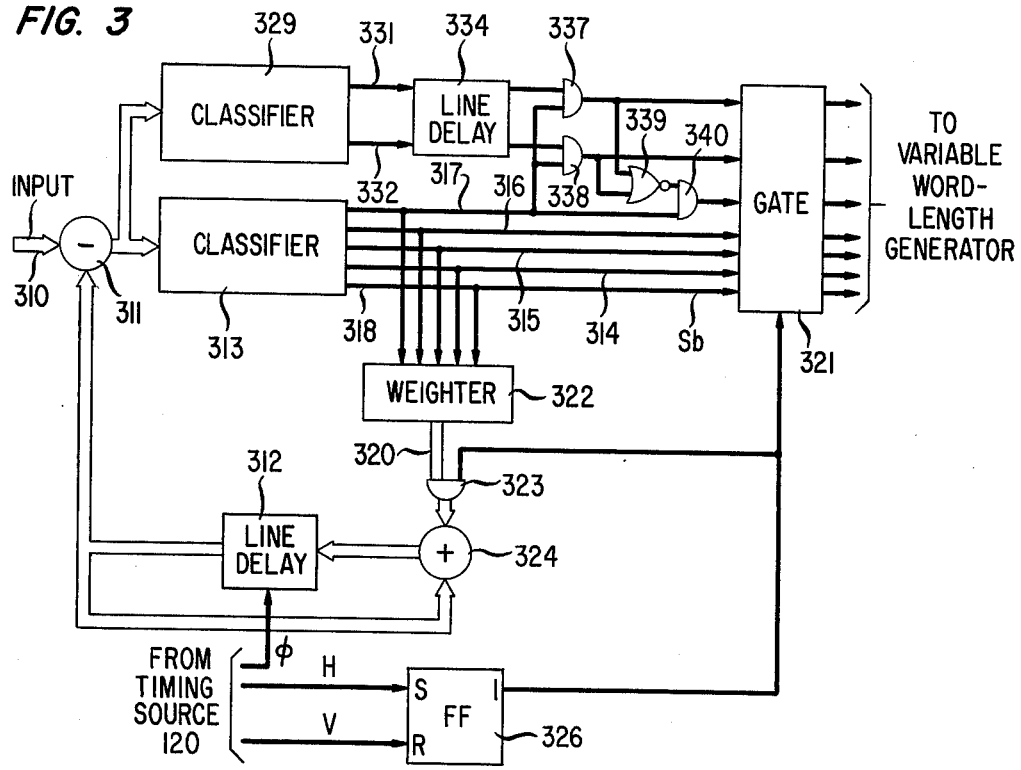
FIG. 3 is a detailed diagram of the portion of FIG. 1 used to encode the chrominance signal.

FIG. 3 illustrates the inventive arrangement in detail for encoding at least one of the chrominance signals presented to the overall coder of FIG. 1. In the case of a NTSC color video, the chrominance signal component C1 contains more information than the C2 component so that the inherent advantages of the invention may be more fully realized by utilizing the illustrative coding arrangement of FIG. 3 to encode the C1 chrominance signal. Although both FIGS. 1 and 3 call for a preliminary conversion to digital of the total analog video signal, it would be equally acceptable, of course, to process input picture elements, each corresponding to an analog sample, directly in analog form and still realize the advantages of the invention since either approach may fully utilize the inventive principles herein disclosed.

In FIG. 3, a PCM-type digital signal, e.g., 8 bits per digital word, is applied in parallel form via parallel bus 310 to one input of subtractor 311. The other input of subtractor 311 accepts the digital information contained in line delay 312 which is indicative of the encoded transmission of a chrominance signal sample in the preceding alternate horizontal scan line that has a location corresponding to the present sample being applied to subtractor 311. The difference between the input signal and the current output of delay 312 is presented by subtractor 311 to classifier 313. This difference is produced by comparing picture elements at corresponding locations in the successive alternate horizontal scan selected for transmission. Classifier 313 produces a pulse on one of four parallel output conductors 314–317 to indicate the magnitude level of the difference signal. The remaining output, or conductor 318, utilizes a pulse or no pulse to indicate the sign of the magnitude level. The presence of a pulse on conductor 317 represents an output from subtractor 311 within the range of the highest predetermined level of classifier 313 while a pulse on conductor 314 indicates the difference produced by subtractor 311 is in the range of the lowest predetermined level of classifier 313. Conductors 314–318 are connected to weighter 322 and also applied to a variable word length generator, such as generator 121 of FIG. 1, to be gated into a buffer for transmission.

Weighter 322 is embodied in a manner similar to weighter 203 shown in FIG. 2 of U.S. Pat. No. 3,609,552 to J. O. Limb et al, and described in column 3 thereof. The parallel output of weighter 322 on bus 320 updates the content of line delay 312 via AND gate 323 and adder 324 which are all designed to operate on their respective signals in parallel form and provide a prediction signal for subtractor 311. Gate 323 is enabled by the output of flip-flop 326 during alternate horizontal scan lines. Therefore, the accumulation function performed through the circuit association between line delay 312 and adder 324 is updated by the output of weighter 322 when gate 323 is enabled in accordance with the output of classifier 313 during the alternate scan lines selected for transmission.

Figure 4:
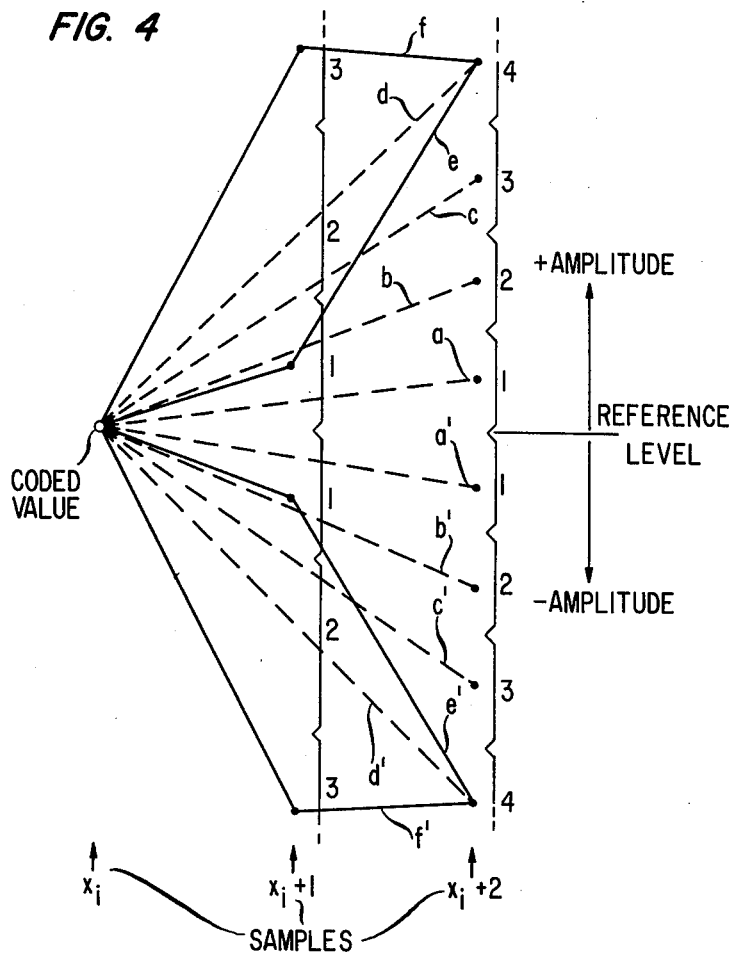
FIG. 4 is a diagram serving to illustrate the transitions available for coding successive picture element values.

Reference to the diagram of FIG. 4 will provide a complete explanation of the operation of an arrangement of FIG. 3 with the attendant advantages thereof. FIG. 4 serves to illustrate the operation of the arrangement of FIG. 3 for picture elements at corresponding locations in three successive horizontal scan lines. The first picture element $x_i$ represents the coded value, which is the predicted value of delay 312 plus encoded difference, of a typical picture element in one of the alternate horizontal scan lines selected for encoding and transmission. The next value to be most likely encoded is $x_i + 2$ since the chrominance signal is transmitted to correspond to alternate horizontal scan lines. The distance of each dot in FIG. 4 from the reference level serves as an illustrative value of an encoded amplitude level that is transmitted. When the actual difference between successive samples falls within a particular bracket or region of an encoded or quantized level that level is transmitted. If the difference signal produced by subtractor 311 is within the range of the six inner levels, three negative and three positive, of classifier 313 the chrominance information encoded for transmission only corresponds to alternate horizontal scan lines.

When the difference signal produced by subtractor 311 is within the range of the two outer levels of classifier 313, the encoded level of the difference signal produced by the intermediate picture element in the line sandwiched between alternate horizontal scan lines may be transmitted to improve resolution. Classifier 329 codes the level of intermediate picture elements. Since information is usually only transmitted for alternate lines, a signal averaging technique is utilized to construct the corresponding picture element values of the intermediate lines. This is done by interpolation wherein half the differences between corresponding picture elements of alternate scan lines are used as the values of the corresponding picture elements of the intermediate line. However, if the differences are so large as to correspond to the outer limits of classifier 313, the interpolation technique may not provide an accurate reconstruction of the corresponding intermediate picture element. Therefore, classifier 329 utilizes three ranges for each polarity to provide additional information for reconstructing the intermediate picture element associated with the large transition. Accordingly, classifier 329 produces a pulse on one of its output conductors 331 and 332 or none of them to indicate the range of the amplitude of the intermediate picture element. In FIG. 4, the dashed lines between picture elements are indicative of the interpolation process while the solid lines depict the process of providing improved resolution for reconstructing the intermediate picture element during the occurrence of a large transition in signal level between alternate picture elements in corresponding positions in three successive horizontal scan lines.

More specifically, a pulse on conductor 331 indicates the first range. A pulse on conductor 332 indicates the third range while no pulse on either conductor represents the second range. In the latter situation, since the corresponding picture element of the intermediate scan line is just as accurately reconstructed by interpolation, it is used. These outputs are applied to delay 334 whose propagation interval is such that its output is concurrent with the output of classifier 313 for the corresponding picture element in the next alternate scan line.

The gating arrangement which includes gates 337–340 is utilized to provide the appropriate interaction between the outputs of classifier 313 and 329. More specifically, when one of the two outer levels is indicated by classifier 313, a pulse is present on conductor 317. This pulse enables AND gates 337 and 338. If no signal is produced by delay 334 at this time, the outputs of gates 337 and 338 remain low and enable AND gate 340 via NOR gate 339. Accordingly, the same information is presented to gate 321 as if classifier 339 were not present since interpolation produces an accurate reconstruction of the corresponding picture element. However, if the situation is such that the corresponding picture element difference is in the first range or third range, delay 334 will produce an output respectively at either gate 338 or gate 337. This output in conjunction with the pulse on conductor 317 will cause either gate 337 or 338 to produce an output for gate 321. At the same time, the produced output will inhibit gate 340 so that additional information from classifier 329 is applied to gate 321 instead of the pulse on conductor 317 from classifier 313. Gate 321 contains a plurality of AND gates which are enabled by a "1" level output of flip-flop 326. This output is produced for the alternate horizontal scan lines selected for transmission in accordance with the timing pulses produced by timing source 120 of FIG. 1.

Figure 5:
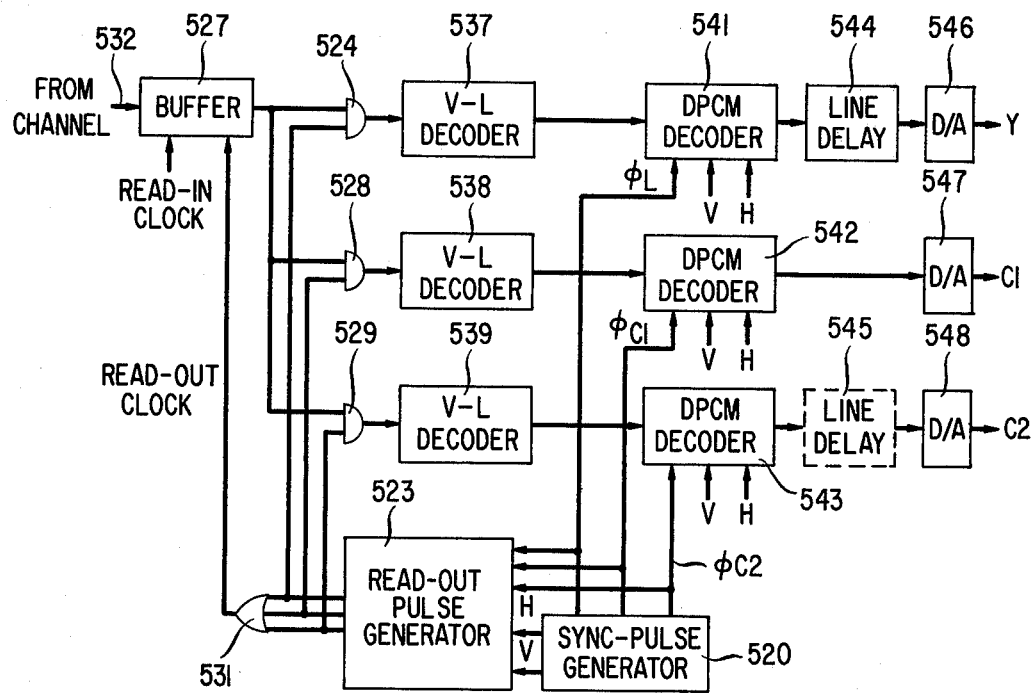
FIG. 5 is a general decoder diagram of an arrangement to be used in conjunction with FIG. 1.

FIG. 5 is a diagram of an overall decoder designed to receive the total video signal from the arrangement of FIG. 1 via a suitable transmission medium at input 532 of buffer 527. The video signal is read out of buffer 527 and applied to AND gates 524, 528 and 529. Gates 524, 528 and 529 are enabled by pulse signals produced by readout pulse generator 523. The pulse signals from generator 532 are therefore produced with the same relative timing as that illustrated by the diagram of FIG. 2. Thus, the information is removed or read-out of buffer 527 in the same sequence as was applied or read-in to buffer 127 of FIG. 1. OR gate 531 combines these pulse signals to provide the read-out clock signal for buffer 527. When information is extracted from buffer 527, gate 524 is enabled to apply the digital luminance signal to decoder 541 while one chrominance signal is applied to decoder 542 by enabling gate 528 and gate 529 is enabled to apply the second chrominance signal to decoder 543.

Decoders 537–539 transform the variable length code words into code words of fixed length for respective application to differential PCM decoders 541–543 which produce PCM output signals. The PCM signal from decoder 541 is retained for an interval of one line by delay 544 before application to digital-to-analog converter 546. Since the combination of differential PCM coder 542 and its corresponding coder 117 of FIG. 1 delay the C1 chrominance signal for a line interval, delay 544 is necessary to provide concurrent signal components of the total video signal which correspond to those applied at the input of the arrangement of FIG. 1. Accordingly, the digital input to and the analog output of converters 546 and 547 are in step to provide as an output replicas of their respective portions of the video signal. Line delay 545 between decoder 543 and digital-to-analog converter 548 is shown in dashed lines to indicate that it is optional. In other words, if the C2 chrominance signal is conventionally encoded using differences along horizontal scan lines, delay 545 is necessary for the same reason as delay 544. But by coding and decoding the C2 chrominance signal in accordance with the techniques performed by the arrangements of FIGS. 3 and 6, this chrominance signal will also be retained for an interval corresponding to the duration of a horizontal scanning line thereby eliminating the necessity of delay 545. These PCM output signals are then transformed by digital-to-analog converters 546–548 into analog signals of the transmitted arrangement of FIG. 1.

Figure 6:
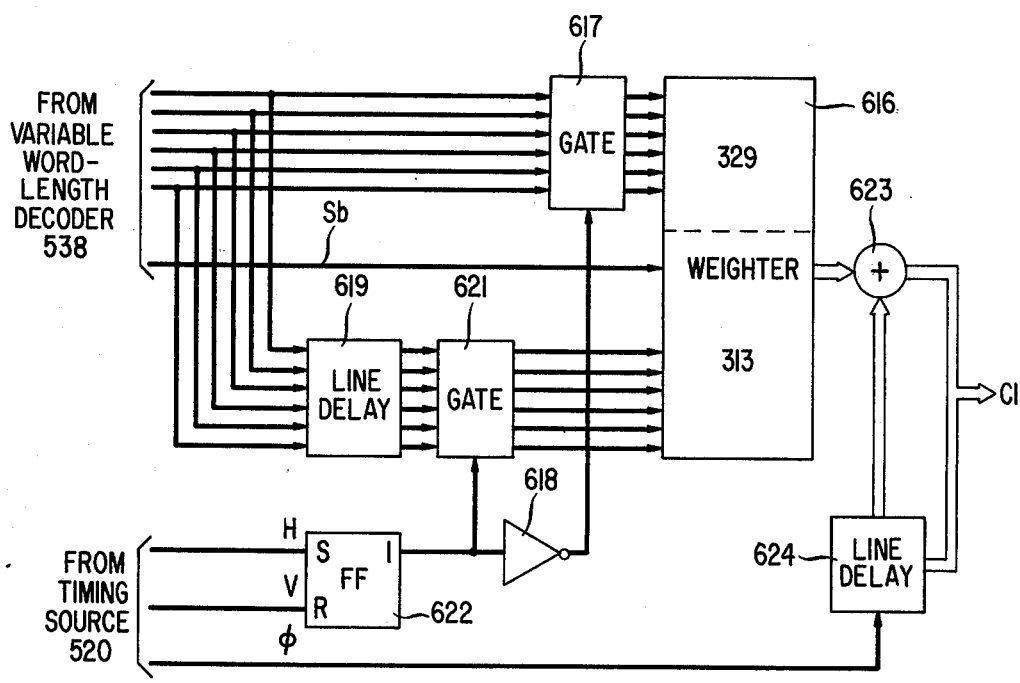
FIG. 6 provides detailed information of a portion of FIG. 5.

FIG. 6 shows in greater detail one of the differential PCM decoders of FIG. 5. As mentioned earlier, this decoding arrangement may be utilized for at least one, if not both, of the two chrominance signals which is encoded using differences between corresponding picture elements of alternate video lines selected for transmission. Of course, the arrangement of FIG. 6 should be utilized to provide the complementary decoding operation that was produced by the combination of the arrangements of FIGS. 1 and 3. More specifically, if the C1 luminance component of a NTSC total video signal is encoded according to the arrangement of FIG. 3, the received C1 luminance signal should be decoded using the arrangement of FIG. 6. Thus, the input to FIG. 6 is the differential PCM code words produced by variable word length decoder 538.

In FIG. 6, the input signal is applied to weighter 616 through two signal paths. The direct signal path includes gating network 617 which includes a plurality of AND gates that are enabled by the output of inverter 619. The signal of the other path encounters the propagation delay introduced by delay 619 before it is applied to weighter 616 when gate 621 is enabled. Although the received chrominance signals arrive in step with alternate horizontal scan lines selected for transmission, signals are applied to weighter 616 for each line first from gate 617 and then from gate 621 during the next line. Actually, weighter 616 comprises two portions, one for each set of input signals applied thereto.

The operation of weighter 616 is represented by the information listed in the following table.

| Levels/Paths | Relative Differences | | Total Difference of Alternate Pels |
|---|---|---|---|
| | Gate 617 | Gate 621 | |
| a | 1 | 1 | 2 |
| b | 3 | 3 | 6 |
| c | 6 | 6 | 12 |
| d | 10 | 10 | 20 |
| e | 3 | 17 | 20 |

-continued

| Levels/Paths | Relative Differences | | Total Difference of Alternate Pels |
|---|---|---|---|
| | Gate 617 | Gate 621 | |
| f | 22 | −2 | 20 |

The column of letters to the left in the table corresponds to the transition paths shown in FIG. 4. The table, for the sake of simplicity, represents only the positive transition paths since a sign change of each difference value will provide the symmetrical negative transitions. The next column of numbers to the right indicates weighted difference values in relative units produced by weighter 616 in response to the code word output of gate 617. The next column of numbers to the right, or third column, indicates weighted differences associated with the output of gate 621. The final column at the extreme right lists the total difference between corresponding picture elements (pels) in successive alternate lines selected for transmission. Paths a - d illustrate the normal interpolation process wherein weighter 616 produces half the difference values at twice the rate of weighter 322 in FIG. 3. Accordingly, the accumulation function performed by adder 623 and delay 624 receives a difference output for each horizontal scan line to provide an output digital signal which is to be transformed by converter 547 of FIG. 5 into an analog chrominance signal with conventional characteristics.

For the signal paths e and f, one of two code words in the six output word or signal representations vocabulary for positive transitions in the arrangement of FIG. 3 is used to indicate each of these paths. When this code word is first applied to weighter 616 via gate 617 the weighter produces a change of 3 or 22 in response to the particular code word that is received. During the next line the same code word appears at weighter 616 via gate 621. At this time, weighter 616 produces either a change of 17 or minus 2 so that the total difference corresponds to 20.

Although other arrangements may be utilized to provide the combination of interpolating and decoding performed by the arrangement of FIG. 6, the illustrative arrangement herein disclosed is preferred for its relatively simple design. In order to appreciate fully the overall coding and decoding arrangement including FIGS. 1 and 5 which respectively incorporate the arrangements of FIGS. 3 and 6, it is pointed out that as luminance differences are encoded between successive samples in the horizontal scan line, at least one of the chrominance signals is encoded by using differences between corresponding picture elements of alternate lines selected for transmission or differences that are orthogonal to the luminance differences. Within the video processing that takes place in this operation, the decoding receiver of FIG. 6 utilizes weighter 616 which produces half the differences of its counterpart, weighter 322 of FIG. 3, for transmitted values as part of the normal interpolation process, but not for encoded intermediate picture elements. Since the latter are delayed one line by the arrangement of FIG. 3 and the half values used for the former in the arrangement of FIG. 6 is equivalent to the same delay, the chrominance signal processing end-to-end produces a delay of one horizontal scan line interval over and above the propagation delay of transmission experienced by the total video signal. Accordingly, delay 544 is required to provide concurrent luminance and chrominance components in the total video signal.

It should also be pointed out that the utilization of variable length coding is one way to realize the full advantage of the negative orthogonal correlation. More specifically, the most commonly used quantum levels are represented by shorter code words so that as one signal component requires longer code words, in a given instance, the other signal component is represented by the shorter code words. On the whole, this arrangement reduces fluctuations in the information rate for transmission.

In all cases it is to be understood that the above-described arrangements are merely illustrative of a small number of the many possible applications of the principles of the present invention. Numerous and varied other arrangements may be utilized by those skilled in the art without departing from the spirit and scope of the invention.

What is claimed is:

1. A video encoder for use with a video information signal including a luminance signal component and at least one chrominance signal component, the encoder comprising:
   first means connected to receive and encode differences in the luminance signal component between successive samples along horizontal scan lines, and
   second means connected to receive and encode differences in the chrominance signal component between samples in corresponding positions of two different horizontal scan lines that are alternating scan lines separated by an intermediate scan line, said second means indicating each quantum level by a signal representation;
   third means for encoding the differences in the chrominance signal component between samples in corresponding positions of the intermediate scan line and one of the alternate scan lines into a predetermined number of quantum levels, said third means indicating each quantum level by a signal representation, and
   gating means responsive to the signal representations corresponding to at least the quantum levels having the largest value magnitude, said gating means replacing the signal representation of said second means with that of said third means when the latter more accurately indicates the value of the corresponding sample of said intermediate scan line than one-half of the difference between corresponding samples of the alternate scan lines.

2. The video encoder of claim 1 further comprising variable word length encoding means, responsive to said first, second and third means, for providing code representations including a variable number of information bits to provide an efficient code representation of the video information signal having a substantially constant information rate.

3. In a video encoder for use with a video information signal including a luminance signal and at least one chrominance signal, the encoder being of the type that encodes the luminance signal from successive samples along scan lines, apparatus for encoding the samples of the chrominance signal comprising:
   first means for encoding the difference between corresponding samples of alternate scan lines into a predetermined number of quantum levels, said first means indicating each quantum level by a signal representation, second means for encoding the difference between the corresponding sample of an intermediate scan line between said alternate lines and the corresponding sample of one of said alternate lines into a predetermined number of quantum levels, said second means indicating each quantum level by a signal representation, and gating means responsive to the signal representations corresponding to at least the quantum levels having the largest value magnitude, and replacing the signal representation of said first means with that of said second means when the latter more accurately indicates the value of the corresponding sample of said intermediate scan line.

4. A video encoder for use with a video information signal including a luminance signal component and at least one chrominance signal component, the encoder comprising:

first means for encoding the luminance signal component as differences between successive samples along horizontal scan lines;

second means for encoding differences in the chrominance signal component between two samples separated by an intermediate sample into a predetermined number of quantum levels each indicated by a code representation;

third means for encoding differences in the chrominance signal component between one of the two samples and the intermediate sample into a plurality of quantum levels each indicated by a code representation; the plurality being smaller than the predetermined number; and gating means responsive to at least the quantum levels of the predetermined number having the largest value manitude, said gating means replacing the code representation of said second means with that of said third means when the latter indicates the value of the intermediate sample with less error than half the value of the difference between the two samples.

5. A digital transmission system comprising:

a transmitting source of digital signals indicative of sampled picture element values of a video information signal that includes a luminance signal component and at least one chrominance signal component, said source producing first code groups indicative of the difference in values of successive elements of the luminance signal component, and said source producing second code groups indicative of the difference in values between pairs of alternate picture elements separated by intermediate picture elements of the chrominance signal component;

first means for decoding the first code groups by producing picture element values from the first code groups to reconstruct the luminance signal component;

second means for decoding the second code groups by producing picture element values of the alternate and intermediate picture elements to reconstruct the chrominance signal component, said second means comprising third means for producing the second code groups at spaced regularly occurring intervals, fourth means for producing the second code groups in the spaces between the regularly occurring intervals, weighting means responsive to the second code groups produced by said third and fourth means, said weighting means producing an output having half the value of the encoded difference indicated by each of said second code groups, accumulating means for adding the successive outputs of said weighting means to produce a digital signal output indicative of the encoded and intermediate picture element values of the chrominance signal component, and means for delaying said luminance signal component an interval corresponding to half of the duration of the spacing between successive alternate picture elements to produce a luminance signal component concurrent with the chrominance signal component.

6. The transmission system of claim 5 wherein said transmitting source encodes the difference between the first one to occur of said pair of alternate picture elements and the intermediate picture element into a code representation used to replace one of said second code groups indicative of a large magnitude difference when the code representation will more accurately indicate the value of the intermediate picture element than one-half the difference of the large magnitude, and said weighting means responds to the code representation by producing as an output having the value indicated for its first occurrence as produced by said third means and the large magnitude by its second occurrence as produced by said fourth means so that said accumulating means produces a digital output indicative of the values of both the intermediate picture element and the large magnitude difference.

* * * * *